March 18, 1941. L. G. DANIELS 2,235,608
VALVE
Original Filed Oct. 12, 1933

Inventor:
Lee G. Daniels

Patented Mar. 18, 1941

2,235,608

UNITED STATES PATENT OFFICE 2,235,608

VALVE

Lee G. Daniels, Rockford, Ill.

Original application October 12, 1933, Serial No. 693,330, now Patent No. 2,093,692, dated September 21, 1937. Divided and this application August 23, 1937, Serial No. 160,381

7 Claims. (Cl. 251—84)

This application is a division of my copending application, Serial No. 693,330, filed October 12, 1933, now Patent No. 2,093,692, issued September 21, 1937.

My invention relates to valves and more particularly a new and improved multi-port, lift-turn, rotary plate type valve especially designed for use with water softeners and filters, but adapted for a variety of other purposes wherever a valve having the characteristics mentioned would be suitable.

In the parent application I disclosed a lift-turn, rotary plate type valve having separate small gaskets on the plate for engagement with seat rings on the body and having means for raising, turning, and seating the plate under spring pressure. It is the principal object of my present invention to provide a valve of that type with a different means for raising, turning, and seating the plate, eliminating spring action, so that the plate is seated positively and cannot, therefore, be raised off its seat by sudden surges in water pressure in the line although it is easier to open because there is no resisting spring means.

A further object is to provide a valve of the kind mentioned embodying threaded means for raising and lowering the plate whereby not only to obtain easier operation and the ability to seat the plate more firmly with very little effort, but obtain gradual opening and closing and thereby eliminate objectionable water hammer action and also a tendency for the plate to chatter relative to the seat rings.

A still further object is to provide a valve of more compact design and one which requires less free space above and around it in its operation and which is moreover handier to operate.

The invention is illustrated in the accompanying drawing in which—

Figure 1:
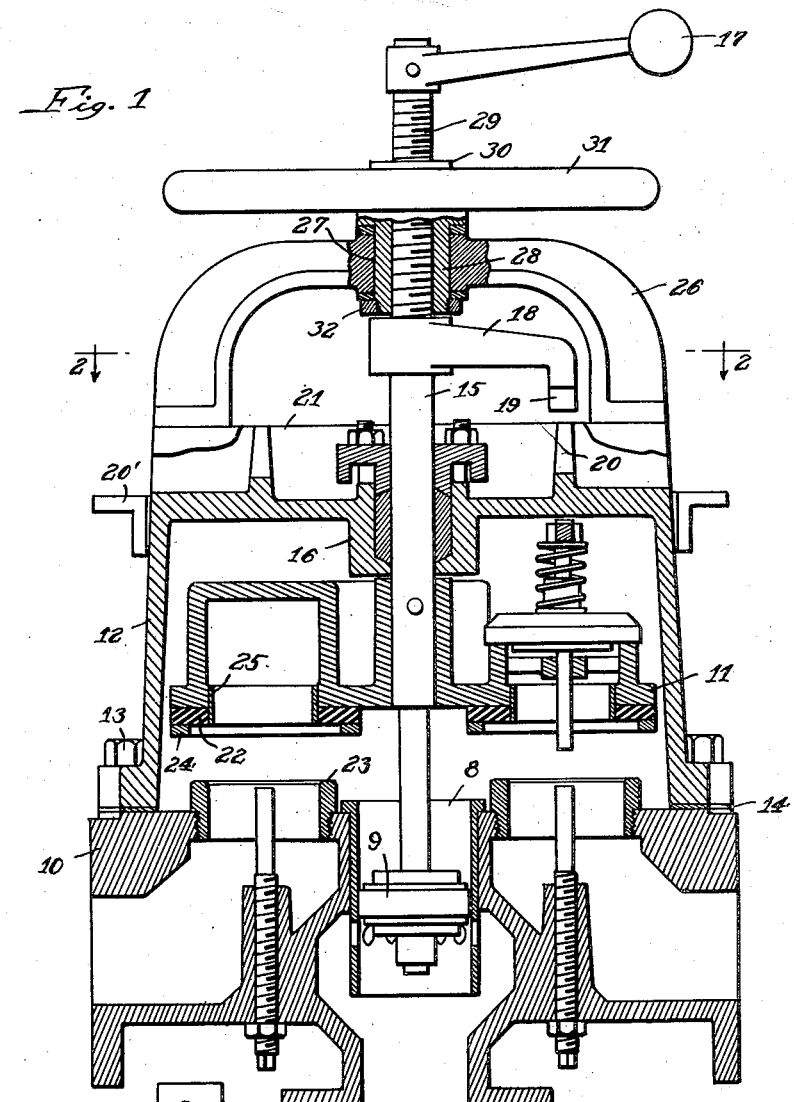
Figure 2:
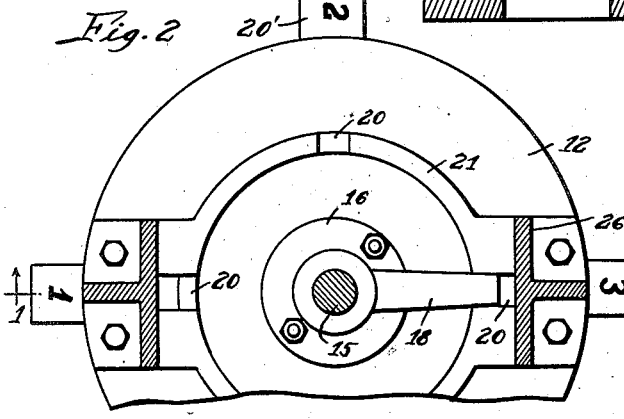

Figure 1 is a central longitudinal section through a valve made in accordance with my invention taken on the line 1—1 of Fig. 2; and Fig. 2 is a cross-section on the line 2—2 of Fig. 1.

The same reference numerals are applied to corresponding parts in these views.

The valve of my invention, as stated above, has been especially designed for use interchangeably on water softeners and filters. However, it is adapted for a variety of purposes and any reference hereinafter to water softening or filtering should not be regarded in any sense as imposing a limitation on the application of this invention. The valve is suitable for industrial purposes and wherever it is desired to control the flow of any fluid in a similar manner.

The numeral 10 designates the cast body of the valve in which a plurality of ports and passages are provided for cooperation with ports and passages in a rotary stem plate 11 whereby to control a system of communication between pipes connected with the body and communicating with the passages thereof. The body 10, in other words, constitutes the stator and the stem plate 11 the rotor. The plate 11 is enclosed by a cover 12 fastened suitably by bolts 13 onto the body 10, with a gasket 14 compressed between the parts to prevent leakage. A valve stem 15 projects from the center of the plate 11 through a suitable stuffing box 16 provided in the cover, whereby to permit turning the plate by means of a hand lever 17 fixed to and extending radially from the upper end of the stem 15. An arm 18 also extends radially from the stem 15 just above the cover 12 and has a tooth 19 on the outer end thereof adapted to be received in any one of a plurality of notches 20 formed in an annular flange 21 projecting from the cover, whereby to indicate the position of the plate and lock the plate in a selected position against turning before unseating. The cover is preferably provided with numbered tabs 20' in radial alignment with the notches 20 so that the operator can readily tell in what position the valve is set. Valves of this general type, known as rotary plate type valves, have usually been constructed with the plate held down in direct metal-to-metal contact with the flat seat on the body, with the result that when the plate was turned the part became scored and leakage resulted. It was then only a question of time when the leakage would become excessive and repair or replacement would be necessary, which meant not only considerable expense but the annoyance of interrupted service. By having the plate arranged to be unseated before it is turned, as herein disclosed, the objection as to scoring is avoided. Furthermore, I am thereby enabled to utilize gaskets 22 of soft rubber or other resilient material on the rotary plate around the ports thereof for engagement with metallic seat rings 23 suitably mounted in the ports in the body 10. In that way, I secure a good leakproof fit for the plate on the body without necessitating heavy pressure on the plate as was heretofore the case where a metal-to-metal contact was relied upon. The gaskets 22 are suitably held in place by rings 24 fastened by screws to the plate 11. Bushings 25 inserted in the ports in the plate project from the plate sufficiently to center the gaskets and keep the latter from spreading and getting out of shape as a result of the compression thereof onto the seats. It is, of course, a matter of no great expense to replace these individual gaskets and this design is, therefore, ideal for the larger sized valves. The seat rings 23 can also be produced at comparatively low cost and are threaded or otherwise held in place for easy removal and replacement should that ever become necessary. The central port 8 is usually connected to the source of water or other fluid supply under pressure, and the fluid is distributed from inside the cover 12 through the ports in the plate 11 to pipes connected to the body 10. The fluid is shut off by the valve 9 whenever the plate 11 is unseated.

A yoke 26 is mounted on top of the cover 12 and has a center bearing 27 in which a nut 28 threaded on the threaded upper end 29 of the stem 15 is swiveled. The nut 28 is mounted on or forms an integral part of the center hub 30 of a hand wheel 31 adapted to be turned in one direction to unseat the plate 11 and in the opposite direction for seating the same. The small nut 32 retains the hand wheel and its nut 28 against upward displacement when the nut 28 is tightened in the seating of the plate. The lever 17 previously mentioned is used merely to turn the plate by means of its stem 15 when unseated.

In operation it should be clear that when the hand wheel 31 has been turned to disengage the tooth 19 from one of the notches 20 the plate 11 can be turned by means of the lever 17 in either direction to bring the tooth 19 into alignment with one of the other notches for a different position of the valve, whereupon if the hand wheel 31 is then turned in the opposed direction the plate 11 will be lowered and seated with its gaskets 22 firmly engaging the seat rings 23. The tooth 19 prior to engagement of the gaskets with the seat rings enters the selected notch 20 and thereby locks the plate 11 against turning. The numbered tabs 20' appearing in Fig. 2, facilitate operation of the valve where there is a predetermined sequence of valve positions as, for example, in the regeneration of a water softener. Thus, the number 1 position is for back-washing, the number 2 position for salting and rinsing, and the number 3 position for normal softening operation. There is no need for a detailed description in this application of the different circuits established through the valve in the different positions of the plate 11, inasmuch as that is fully described in the parent application. It is more important here to point out that the threaded means 28—29 for seating and unseating the plate 11 offers numerous advantages:

(1) It makes it easier to open and close the valve because of the mechanical advantage derived by the threads and the fact that there is no counter-acting spring closing means to resist the opening of the valve.

(2) It provides for gradual opening and closing of the valve so that there is no likelihood of water hammer action such as occurs when a valve is abruptly opened and closed.

(3) The operation is positive in both directions in contrast to the impositive operation obtained with spring means and this offers the advantage of freedom from chattering of the plate relative to the seat rings in the opening and closing of the valve, as well as avoiding the objection of the plate being apt to lift off its seat against the pressure of its spring closing means when there is a sudden surge in water pressure in the line, caused, for example, by closing some other valve in the line too fast.

(4) It permits the operator to increase pressure on the plate in seating in case there is tendency or likelihood of leakage with old gaskets.

(5) The elimination of springs makes for greater dependability, springs being objectionable because of the likelihood of breakage.

(6) The rotary hand wheel 31 and rotary lever 17 take up less room and are handier to operate, besides being operable in more confined space than other types of operating means.

It is believed the foregoing description conveys a good understanding of all of the objects and advantages of my invention. The following claims have been drawn with a view to covering all legitimate modifications and adaptations.

I claim:

1. In a lift-turn valve, a ported stator member and a ported rotor member disposed in superimposed relation arranged to be seated on the body member in any of a plurality of positions of rotation about its center as an axis, a resilient gasket of soft rubber interposed therebetween to cushion and seal the engagement of the rotor member in seating on the stator member, threaded means for raising and lowering the rotor member, whereby said gasket may be subjected positively to distorting seating compression after the rotor member is seated by continued actuation of said threaded means, means for turning the rotor member when unseated, and means on the rotor and stator members slidably engaged in the seating and unseating movements to prevent sliding movement between the meeting faces of the stator member, rotor member, and gasket when in surface contact and to lock the rotor member in predetermined positions of rotary adjustment prior to the seating thereof.

2. In a lift-turn valve, a ported body member, a ported stem plate member arranged to be seated on the body member in any one of a plurality of positions of rotation about its stem as an axis, seat rings in the ports in the body member projecting from said body member toward the stem plate member and individual resilient gaskets on the stem plate member for engagement with said rings, a cover on the body member enclosing the stem plate, the stem of the stem plate projecting through the cover and being slidable endwise and rotatable relative thereto to permit lifting, turning and reseating the stem plate member, a locking ring rigid with the cover and having a plurality of circumferentially spaced recesses provided therein, a cooperating locking member to engage detachably in said recesses rotatable with the stem, threaded means acting between the stem and the cover to lift and reseat the stem plate, the resilient gaskets being compressible after engagement with the seat rings when the threaded means is tightened, the stem plate being rotatable when the locking member is disengaged from the locking ring.

3. In a lift-turn valve, a ported stator member, a ported rotor member liftable from engagement with the stator member and rotatable to another position and reseatable on the stator member, an operating stem projecting from the center of the rotor member, threaded means cooperating with the stem and arranged when turned in one direction to raise the rotor member and when turned in the other direction to reseat the same, a locking ring stationary with the stator member and having a plurality of circumferentially spaced locking recesses provided therein, means for turning the stem to rotate the rotor member from one position to another and also rotating a locking member relative to the locking ring for engagement in the recesses thereof to hold the stem releasably against turning from adjusted position, and resilient gasket means compressible between the stator member and rotor member to cushion and seal the engagement of the rotor member with the stator member, said gasket means being compressible to varying degrees according to the degree of tightening of the aforesaid threaded means.

4. In a lift-turn valve, a ported stator member, a ported rotor member liftable from engagement with the stator member and rotatable to another position and reseatable on the stator member, an operating stem projecting from the center of the rotor member, threaded means cooperating with the stem and arranged when turned in one direction to raise the rotor member and when turned in the other direction to reseat the same, a locking ring stationary with the stator member and having a plurality of circumferentially spaced locking recesses provided therein, a hand lever for turning the stem to rotate the rotor member from one position to another and also rotating a locking member relative to the locking ring for engagement in the recesses thereof to hold the stem releasably against turning from adjusted position, projecting seats on one of the stator and rotor members, and compressible gasket material on the abutting face of the other of said members compressible upon engagement with said projecting seats.

5. In a lift-turn valve, a ported stator member, a ported rotor member liftable from engagement with the stator member and rotatable to another position and reseatable on the stator member, an operating stem projecting from the center of the rotor member, threaded means cooperating with the stem and arranged when turned in one direction to raise the rotor member and when turned in the other direction to reseat the same, a locking ring stationary with the stator member and having a plurality of circumferentially spaced locking recesses provided therein, a hand lever for turning the stem to rotate the rotor member from one position to another and also rotating a locking member relative to the locking ring for engagement in the recesses thereof to hold the stem releasably against turning from adjusted position, seat rings inserted in the ports in the stator member and projecting from the face of said member toward the rotor member, and individual rubber gaskets on the cooperating face of the rotor member for compression by engagement with said rings.

6. In a plate type valve comprising a ported body member and a ported plate member, separate and independent tubular bushings secured in and projecting from the ports of one of said members, separate and independent compressible resilient rubber seats around each of said tubular bushings for engagement with and compression against seating surfaces provided on the other member to space said members relative to one another and establish sealed communication with the cooperating ports of the other member in different positions of the plate member to the body member, said bushings acting to support the inner walls of the seats, and means for relieving seating pressure of the plate member on said seats and turning the plate member.

7. In a plate type lift-turn valve comprising a ported body member, and a ported plate member, separate and independent tubular bushings secured in and projecting from the ports of one of said members, separate and independent compressible resilient ring seats around each of said tubular bushings for engagement with and compression against seating surfaces on the other member to establish sealed communication with the ports of the other member in different seated positions of the plate member in relation to the body member, and means for unseating, turning, and reseating the plate member.

LEE G. DANIELS.